United States Patent [19]

Cannon

[11] 3,851,116

[45] Nov. 26, 1974

[54] AUTOMATIC MAGNETIC TAPE INFORMATION RETRIEVAL SYSTEM WITH SPEED AND POSITION TAPE DRIVE CONTROL

[75] Inventor: Max R. Cannon, Boulder, Colo.

[73] Assignee: International Business Machines Corporation, Armonk, N.Y.

[22] Filed: Dec. 10, 1971

[21] Appl. No.: 206,917

Related U.S. Application Data

[63] Continuation of Ser. No. 887,904, Dec. 24, 1969, abandoned.

[52] U.S. Cl. .................... 179/100.2 S, 340/174.1 C
[51] Int. Cl. .......................................... G11b 15/52
[58] Field of Search......... 179/100.2 S; 340/174.1 C

[56] References Cited

UNITED STATES PATENTS

| | | | |
|---|---|---|---|
| 2,900,132 | 8/1959 | Burns et al. | 179/100.2 S |
| 3,541,271 | 11/1970 | Joslow et al. | 179/100.2 S |

*Primary Examiner*—Bernard Konick
*Assistant Examiner*—Robert S. Tupper
*Attorney, Agent, or Firm*—Homer L. Knearl

[57] ABSTRACT

A magnetic tape information retrieval system includes control pulses recorded on one control track of a magnetic tape and control circuits which accept and execute instructions from the pulses to regulate both the speed and position of the tape drive to locate selected information recordings on the tape. The control pulses are coded and grouped to consecutively number address segments along the control track and are arranged with equally spaced leading edges. A speed control circuit servo-controls the tape drive speed to synchronize the control pulses with selected periodic reference pulses. A position control circuit decodes the control pulse numbers independently of the tape speed and compares the decoded address segment numbers with a selected information recording number and provides a difference signal proportioned to the distance between the two numbers for varying the speed and direction of the tape drive. Cue signals recorded at selected positions on the information tracks provide a final regulation of the tape drive to locate the exact beginning of a selected information recording.

19 Claims, 8 Drawing Figures

AUTOMATIC MAGNETIC TAPE INFORMATION RETRIEVAL SYSTEM WITH SPEED AND POSITION TAPE DRIVE CONTROL

This is a continuation of application Ser. No. 887,904 filed Dec. 24, 1969, now abandoned.

This invention relates to a magnetic tape information retrieval system for locating selected information recordings on one or more tracks of a magnetic tape.

Magnetic tape information retrieval systems frequently have limited indexing capacity which makes the automatic location of a specified recording difficult. Many magnetic tape recorders include a mechanical index counter which permits approximate location of a desired recording and some broadcast audio systems use cue tones or transparent window techniques to locate a specific position on a tape. Accordingly, it is an object of this invention to provide a magnetic tape retrieval system for variable length information recordings of a variety of types including audio, slow-scan video, digital or analog.

Another object of this invention is to provide a fast and accurate automatic retrieval system for recorded information on magnetic tapes which will locate the exact beginning of a desired information recording.

A further object of this invention is to provide a bidirectional magnetic tape information retrieval system using a single control track to tell tape speed and the tape position which will begin at any tape position to locate a next selected position.

Still another object of this invention is to provide a magnetic tape information retrieval system specifically suited for multiple track recordings on relatively wide magnetic tapes.

In a preferred embodiment of the invention, a magnetic tape is provided which has variable length recordings on information tracks, and control pulses are recorded on a separate control track. Control circuits for the tape drive accept coded instructions of the control pulses to regulate both the speed and position of the tape. The control pulses are coded preferably by width-modulation using two characters to represent binary numbers ZERO and ONE and are arranged in suitable groups to number address segments consecutively along the control track for position control and using a third character which together with the binary characters are arranged with equally spaced leading edges. The speed control logic circuit servo-controls the tape drive and synchronizes the control pulse repetition rate with a reference pulse rate. An address selector produces address numbers corresponding to those of the tape address segments, and a next selected number produced by the selector is stored in a selection register. A timing disc produces timing pulses synchronized with tape speed. A position control logic circuit includes a decoder which counts the number of timing disc pulses gated during each control pulse interval so as to decode the control pulses independently of tape speed. Each successive decoded address number from the control track is stored in an address register. A comparison logic circuit monitors the selection register and address register and produces a difference signal or voltage proportioned to the difference between the two numbers for adjusting the speed and direction of the tape drive until the selected tape address number is reached. A cue signal recorded on the information track provides the final regulation of the tape drive to locate exact beginning of a selected information recording.

The foregoing and other objects, features and advantages of the invention will be apparent from the following more particular description of preferred embodiments of the invention, as illustrated in the accompanying drawings.

Figures 1, 2, 3:
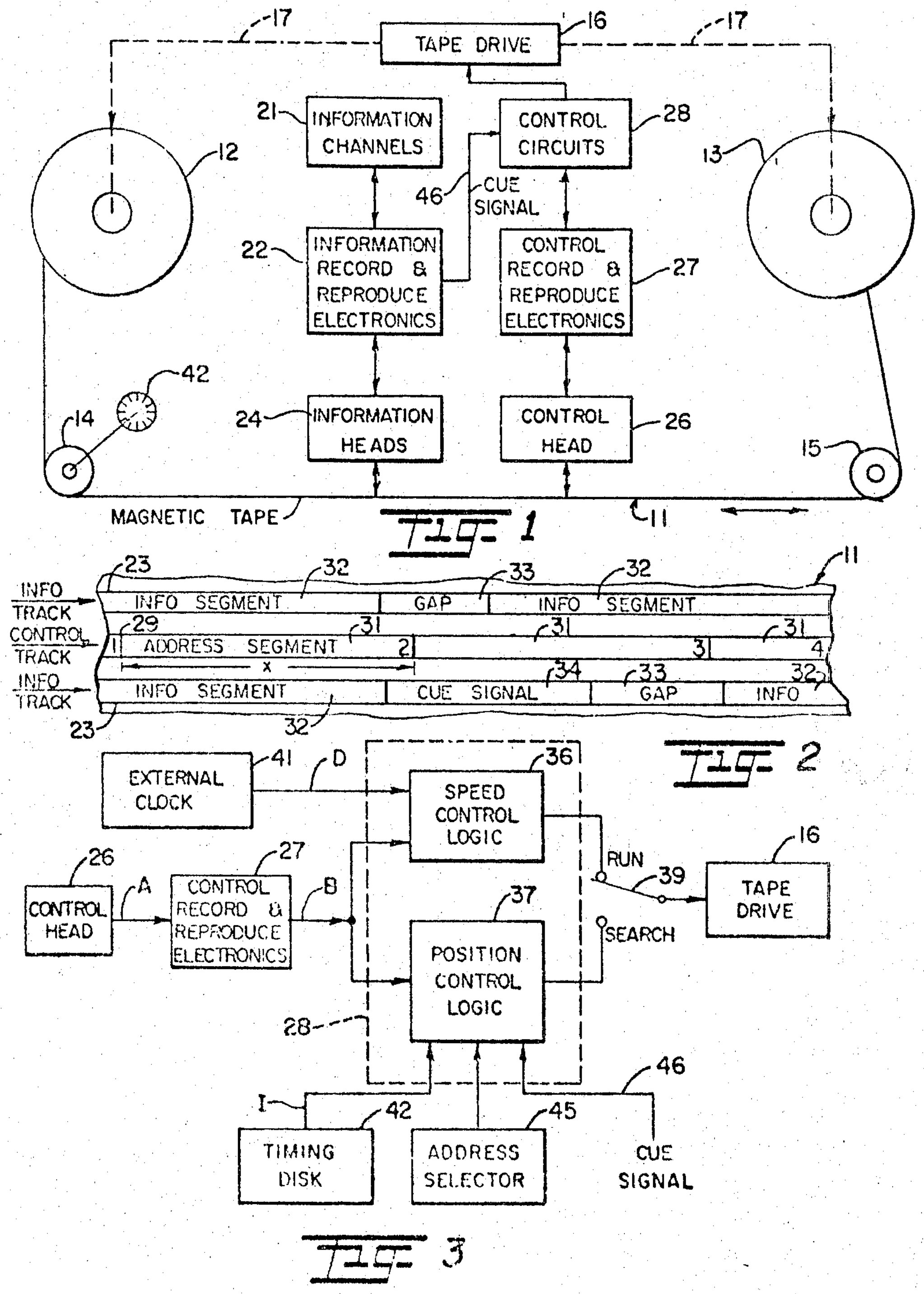
FIG. 1 is a schematic diagram showing the relationship of the various component parts of a bi-directional magnetic tape information retrieval system embodying features of the present invention.
FIG. 2 is a fragmentary plan view of a section of a magnetic tape showing the relative positions of the various recordings on the information and control tracks.
FIG. 3 is a schematic block diagram of the tape drive control circuits and the various timing inputs thereto for speed and position control during retrieval.

Referring now to the drawings, the general arrangement of an automatic magnetic tape retrieval system will first be described generally with reference to FIG. 1 followed by a more detailed description of particular component parts thereof. In the system shown in FIG. 1 a magnetic tape 11 is wound on supply and take-up reels 12 and 13. In its travel the tape 11 is passed over a pair of spaced rollers 14 and 15 which may be either capstans or idlers. A tape drive 16 capable of reversing to move the tape 11 in either direction is suitably coupled to the reels as indicated in dashed lines 17 to rotate the tape reels in either direction. The tape drive 16 may take various forms but typically will include at least one electric drive motor and an electric motor controller which varies the voltage from a power supply to the motor terminals and changes voltage polarity to vary the motor speed and change the direction of rotation. Information comes to the system over a plurality of information channels 21. This information is converted into suitable electrical signal form by information record and reproduce electronic circuits 22 for recording on selected information tracks 23 by information heads 24 during movement of the tape 11 by the tape drive 16. Conversely, the recorded information is read out or reproduced from the information tracks 23 through the information heads 24, information record and reproduce circuits 22, and is selectively reproduced over the respective information channels 21 during movement of the tape by the tape drive. This apparatus for recording and reproducing information on the magnetic tape may be of any conventional type.

In the system shown there is provided a separate control head 26, control record and reproduce electronic circuits 27 and tape drive control circuits 28 operatively associated with a single control track 29 of the tape. Control pulses hereinafter described in detail are generated by the record and reproduce electronic circuits. These control pulses are recorded on the control track 29 and are reproduced from the control track by the control head during tape movement. During a reproduce operation the control pulses are fed to the control circuits which accept and execute instructions of the control pulses to regulate the tape drive speed and direction in searching out a selected information recording on any of the tracks on the tape. While the circuits for both recording information on and reproducing information from the magnetic tape 11 are illustrated in FIG. 1 it is understood that the retrieval system may include only reproduce circuits to locate selected information on prerecorded tapes.

The format of the magnetic tape 11 is illustrated in a simplified segment form in FIG. 2 to show the relative positions of the various recordings on the tape described hereinafter and as shown the tape has a plurality of information tracks 23 each laterally spaced from one another and extending longitudinally of the tape and a single control track 29 also extending longitudinally of the tape. The control track preferably extends throughout the lengthwise extent of the tape. While only two information tracks have been shown to simplify the illustration it is understood that the tape retrieval technique of the present invention is particularly suited for a multiplicity of information tracks on a relative wide magnetic tape. Alternatively the information tracks might be recorded across the width of the tape while the control track is recorded longitudinally along the length of the tape. In this case, information heads 24 (FIG. 1) would be replaced by a rotating head such as those typically used in video recording. The control track is divided into a succession of address segments 31 of equal lengths or distances and, for example, each address segment may be one foot in length. The information tracks have variable length information segments 32 on which selected information is recorded which may be audio, slow-scan video, digital or analog information. The information segments are separated by information gaps 23 and cue signal segments 34 are also located on the information tracks on which suitable cue signals may be recorded. There are three significant spacing or distance relationship: The shortest is the spacing between successive timing disc segments designated *e*, the next being the spacing between successive control track pulses designated *d* and the longest being the spacing between successive address segments designated *x*. The information gap segments are of an equal length and the address segments must be shorter than the shortest information segment so that only one information segment will begin in an address segment.

Figure 4:
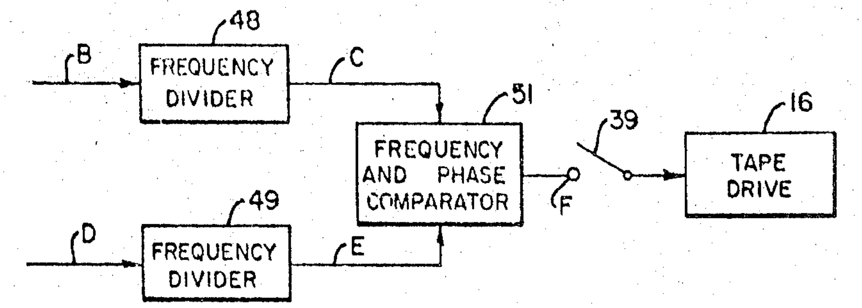
FIG. 4 is a more detailed schematic block diagram of the speed control logic circuit shown in FIG. 3.
Figure 5:
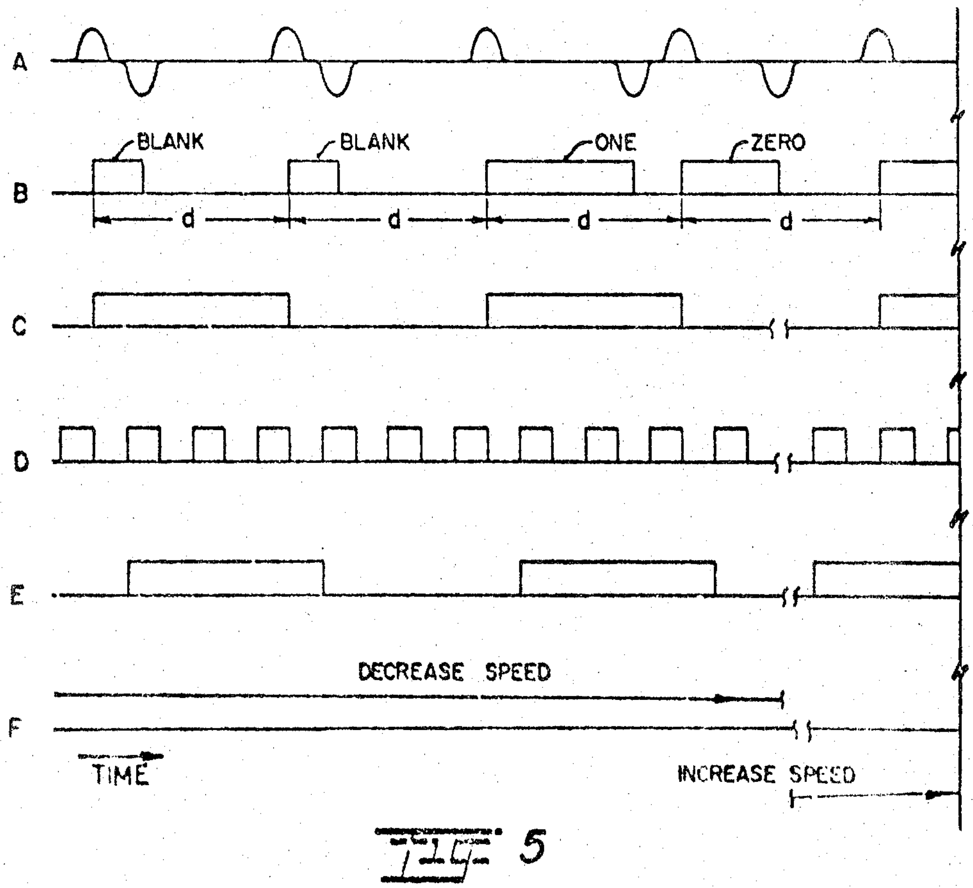
FIG. 5 is a schematic representation of reproduced control track pulses and other wave forms which relate to FIGS. 3 and 4.
Figure 7:
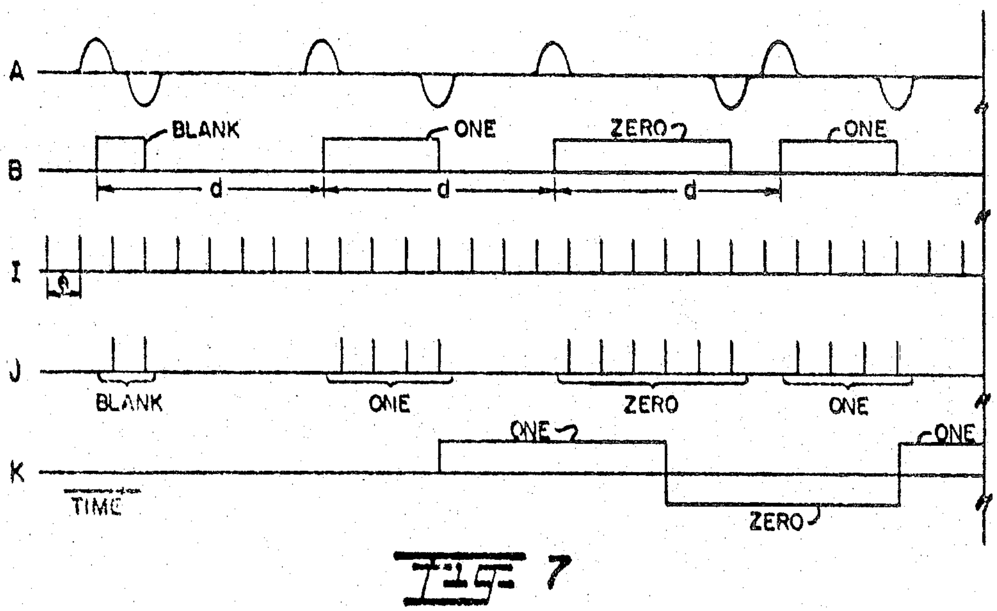
FIG. 7 is a schematic representation of the reproduced pulses and other wave forms which relate to FIGS. 3 and 6.

The recording technique for the control pulses on the control track is best understood with reference to FIGS. 4, 5 and 7 showing the control track pulses designated B. The control track is recorded with digitally coded addresses by a technique which can be read over a wide range of tape speeds. The control track pulses when reproduced from the control head are more sinusoidal in shape as represented by wave forms A. This wave form is changed in the control and reproduce electronic circuit 27 to a corresponding pulse as represented at B. The control track pulses B are coded preferably by the width-modulation shown using two characters of different widths to represent binary numbers ZERO and ONE, which are suitably grouped to consecutively number each address segment along the tape shown in FIG. 2 as address numbers 1–4, and using a third character of still a different width, referred to as a BLANK so as to provide a ternary code. The BLANK characters together with the binary characters are arranged on the tape with equally spaced leading edges represented by the latter *d* for speed control.

Referring now to FIG. 3 the control circuits for the tape drive 15 are shown to include a speed control logic circuit 36 to regulate tape speed during a RUN mode of operation and a position control logic circuit 37 to regulate tape speed and position during a SEARCH mode of operation. A run-search switch 39 alternately connects the output of either the speed control logic circuit 36 or the output of the position control logic circuit 37 to the tape drive 16.

An external electric timing device in the form of an external clock 41 is provided which produces a train of equally spaced periodic reference pulses D shown in FIG. 5 and are applied to the speed control logic circuit 36. A pulse timing device in the form of a timing disc 42 driven by the motion of the tape, as shown in FIG. 1, produces timing disc pulses I which in turn are applied to the position control logic circuit 37. The timing disk 42 is mechanically coupled to the capstan or roller 14 as shown in FIG. 1 to be synchronized with the tape speed. An address selector 45 produces digitally coded instruction to identify a selected information recording and these instructions are applied as an input to the position control logic circuits. The instructions may be on punch cards, paper tape, magnetic tape, etc. The instruction code will include at least the address segment number and the track number and for a multiple tape sytem would include a tape number. A typical instruction or address might be A—2315-47 meaning transport A, 2315 feet along the tape on a track number 47. Cue signals represented at line 46 which are reproduced from recordings on the information track are connected as an input to the position control logic. When the switch 39 is set in the RUN mode the tape is moved at an essentially constant speed whereas in the SEARCH mode the speed is variable according to the distance to the next selected address number.

Referring now to FIG. 4 the speed control logic circuit is shown to include a frequency divider circuit 48 for control track pulses B and another frequency divider circuit 49 for reference pulses D which changes them to the same frequency as represented by pulses C and E, respectively. A frequency and phase comparator circuit 51 compares any frequency or phase differences between pulses C and E and produces an output voltage proportioned to any frequency or phase differences which is applied to the tape drive to make the necessary adjustment in the tape speed to synchronize the two pulses. The frequency comparator portion checks for gross errors or differences and the phase comparator portion checks for close or fine errors or differences. As noted in FIG. 5 when the pulses C derived from the control track lead the pulses E derived from the reference pulses then the voltage F decreases gradually to slow the tape drive down and when the pulses C lag the pulses E then the voltage F increases gradually to speed the tape drive up and in this way the tape drive is servo-controlled by the control track pulses. The significance of the equal spacing between the beginning or leading edges of the control track pulses is that the tape movement may be synchronized or locked into a clock or crystal oscillator so as to move at a constant speed to closely regulate tape position. This is extremely important in reproducing video information which requires extremely stable speed and timing.

Figure 6:
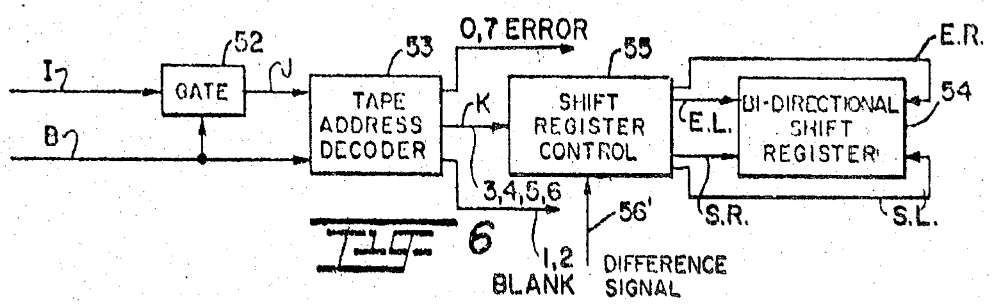
FIG. 6 is a more detailed schematic block diagram of a portion of the position control logic circuit of FIG. 3.

In the position control logic circuit as shown in more detail in FIG. 6 the reproduced control track pulses B are applied as inputs to an AND gate 52 and a tape address decoder circuit 53. The gate 52 gates the timing disk pulses to the decoder during each recorded control track pulse width as shown by the groups of pulses J. Broadly stated the address decoder circuit 53 decodes the address information by counting the number of timing disk pulses during each control track pulse width and produces pulses K representing address numbers for the ZEROES and BLANKS. The significance of using the pulse width of the control track pulses to gate the timing disk pulses is that the search can be carried out regardless or independent of tape speed since there will be the same number of timing pulses gated at any tape speed. For example, in the event the tape speed increases the control track pulses B will recur more rapidly but at the same time the timing disk pulses I will recur more rapidly and the number of timing disk pulses gated during the width of each address pulse will remain the same.

The decoder circuit 53 will preferably include a conventional octal counter having output counts from 0–7 inclusive and OR gates to group the outputs to provide counts 3 or 4 representing a ONE and counts 5 or 6 which represent a ZERO which are the tape address numbers and designated K as an input to the shift register control 55. The decoder has an output for counts 0 or 7 which represent an ERROR for parity checking and an output for counts 1 or 2 representing a BLANK as above described.

The bi-directional shift register has input lines on each side designated EL for enter left and ER for enter right so that the decoded address numbers K are entered on either the left or right side of the register as determined by the shift register control. The bi-directional shift register has shift lines on each side designated SR for shift right and SL for shift left which are controlled by the shaft register control according to the direction of motion or difference signal 56′ hereinafter described. The shift register control is arranged with switching logic circuits preferably AND gates so that when the tape is moving in one direction the decoded tape address numbers are entered in the left side and shifted to the right and when the tape is moving in the other direction the address numbers are entered in the right side and shifted to the left. In this way, the serially decoded address numbers are properly oriented in the shift register regardless of the tape direction and the bi-directional shift register is set by the decoded address numbers from the control track. An address register 57 is loaded by the shift register and at any one time during the tape movement contains the present tape address segment number so that the address register in effect counts up and down in synchronism with tape motion.

Figure 8:
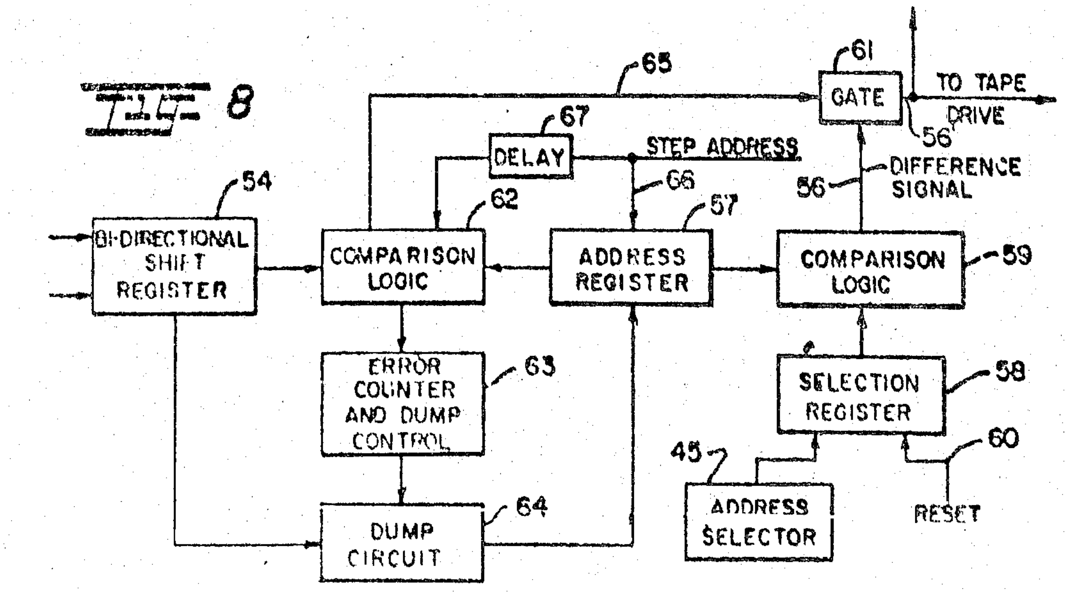
FIG. 8 is a more detailed schematic block diagram of another portion of the position control logic circuit shown in FIG. 3.

A selection register 58 as shown in FIG. 8 receives a selected address number from the address selector 45 previously described. A comparison logic circuit 59 monitors the selection register 58 and the address register 59 and produces a difference signal or voltage over line 56 of a magnitude and polarity which represents the direction and distance from the present tape address segment number to the selected tape address segment number. If the distance is large the tape will be driven hard or at a fast rate. The comparison logic difference signal 56 operates the tape drive 16 through a gate 61 during the search operation. As the tape moves in the proper direction the tape segment address in the address register approaches the address number on the selection register. As the selected address is approached, the difference signal decreases, the tape speed decreases. The difference signal is finally zero when the desired tape address segment is reached. The tape will move through the selected tape segment at a RUN mode speed until the cue signal on the information track is reached. The cue signal being applied to the position control circuit may stop the tape until a GO signal is received or it may gate the information to the record and reproduce circuits so that the desired information recording is reproduced through the information record and reproduce circuits previously described. A reset line 60 into the selection register 58 will clear the register for each new search cycle.

The position control logic circuit shown in FIG. 8 further includes a comparison logic circuit 62 loaded by both the bi-directional shift register 54 and address register 57 which in turn loads an error counter and dump control circuit 63 and dump circuit 64, the latter being connected between an output of the bi-directional shift register and an input to the address register to control the input from the bi-directional shift register to the address register. Assuming that the tape has just been changed, the bi-directional shift register 54 and address register 57 will probably contain different numbers. The comparison logic circuit 62 detects this difference and gates off the difference signal over line 65 connected as an input to the gate 61 so it cannot control the tape drive. The tape drive moves the tape under the RUN mode of operation until the two registers are equal. As each tape address segment passes the control head a "one" is added or subtracted in the address register. A step address derived from the timing disk 42 is entered into the address register over line 66 and into the comparison logic from a delay circuit 67. The delay 67 has a short duration to permit the address register to stabilize before the step address is entered therein. The address register is compared with the bi-directional shift register. An erroneous comparison adds one to the error counter. When a preset number of error counts are reached, the error counter is reset and the number in the bi-directional shift register 54 is transferred or dumped into the address register 57. The two registers are then identical and will step together. The gate 61 is opened to allow the difference signal to control the tape drive. If the tape is spliced, there will again be a mismatch between the address register and the bi-directional shift register. After the preset number of error segments have passed (2 or 3) the new address number is dumped into the address register. If a drop-out causes a single segment noncomparison the address register is not reset.

From the foregoing it is apparent that the pulse recordings on one control track will tell how fast the tape is going and the position or location of the tape. The control circuits described start at one tape position and end at another tape position anywhere along the tape and it is not necessary to begin at any particular tape position. This technique has been found to permit the speed and position control circuits to operate over a range of 6 to 3,000 impulses per second. Although this particular system described pertains principally to audio, the concepts are applicable to various types of information recording and the modulation techniques are intended to be only by way of example.

For broadcast applications, a large number of musical selections are recorded on the magnetic tape which may be as wide as 1 inch. Local announcements are recorded on a similar tape. All tapes are recorded with the odd tracks in one direction and even tracks in the other direction. For example, there are four music tapes, three time announcement tapes and a time tape which are used on eight different tape transports. The music tapes will have recorded descriptive announcements at the beginning and end of each selection. Cue signals or tones are recorded on the music tracks to identify each program. A cue signal of 24 KHz occurs for example five seconds before the end of a musical selection. This permits fadeout, overlapped announcement or warning for line program such as news; a 22 KHz cue signal indicates the end of a musical selection or the beginning of a previous selection; a 20 KHZ cue signal indicates the end of the previous selection announcement or the beginning of the next selection announcement; an 18 KHz cue signal indicates the beginning of a new selection or completion of the next selection announced. The audio information may be a conventional direct recording or may use FM, PWM or other modulation techniques. In addition to the audio or cue signals, a verification address may be multiplied into each information gap so that a positive record identification is possible. Each music tape has a serial or code number at the beginning of the control track which can be checked to insure the correct tape is loaded.

From the foregoing, it is apparent that the timing and rough positioning functions are provided by the control track and the final control of the system is provided by multiplexed cue signals on each information track. A number of techniques can be used for control signal multiplexing. A medium band FM system may be used for the audio or video information. Ultrasonic cue signals can be multiplexed with a much smaller modulation index to reduce bandwidth. The cue signals are not modulated and require only enough separation to permit adequate filtering during playback. An ultrasonic verification address carrier may be multiplexed in a similar manner. It must be modulated perhaps by touch-tone signals or a binary code and requires greater bandwidth. For example, a 16 KHz bandwidth audio or video signal might modulate a 60 KHz carrier. Lower amplitude 18 KHz, 20 KHz, 22 KHz, and 24 KHz cue signals and a 30 KHz index verification carrier could be multiplexed onto the same 60 KHz carrier.

While the invention has been particularly shown and described with reference to preferred embodiments thereof, it will be understood by those skilled in the art that various changes in form and details may be made therein without departing from the spirit and scope of the invention.

What is claimed is:

1. In a magnetic tape information retrieval system, the combination of:

a magnetic tape having segments of recorded information on at least one information track and a control track on the tape coextensive with said information track, said control track having consecutively numbered control pulses, said control pulses having a distinguishable portion occurring at regular intervals recorded thereon and defining a succession of address segments along the control track, tape drive means for moving said magnetic tape in either direction, means for reproducing said control pulses, a tape drive control connected to said tape drive means including means producing a train of periodic reference pulses, a speed control circuit operative in the run mode including means for detecting differences in frequency between said reproduced control pulses and the train of periodic reference pulses, and means for generating a difference signal to vary the speed of said tape drive means whereby the positions of said control and reference pulses are synchronized, and a position control circuit operative in the search mode including means producing timing pulses synchronized with tape speed, means responsive to said synchronized timing pulses for decoding said reproduced control pulses independently of the tape speed, and means for comparing the decoded control pulses with the next selected address segment number, and means for generating a difference signal of a polarity and magnitude related to the direction and distance respectively to said next selected address segment number on said magnetic tape.

2. In a magnetic tape retrieval system according to claim 1 wherein said reference pulses are generated by a clock.

3. In a magnetic tape retrieval system according to claim 1 wherein said control track pulses are width-modulated with different widths to represent binary numbers ZERO and ONE.

4. In a magnetic tape retrieval system according to claim 1 wherein said timing pulses are produced by a timing disk driven by the motion of the tape.

5. In a magnetic tape retrieval system according to claim 4 wherein said position control circuit includes circuit means for counting the timing pulses during the duration of each control pulse so that the control pulses are decoded independently of the tape speed.

6. In a magnetic tape information retrieval system as set forth in claim 1 including a cue signal recorded on a segment of each information track to identify the exact beginning of each information recording.

7. In a magnetic tape information retrieval system as set forth in claim 1 wherein said speed control circuit includes frequency divider circuits to change the frequency of the control track pulses and the reference pulses to the same frequency and a frequency and phase comparator circuit to compare the phase and frequency relationships.

8. In a magnetic tape information retrieval system as set forth in claim 1 wherein said position control circuit includes means for counting the timing pulses during the interval of each control track pulse.

9. In a magnetic tape information retrieval system the combination of:

a magnetic tape having segments of information recordings on information tracks and control pulse recordings on a control track coextensive with the information tracks, said control pulses being coded using two pulse characters representing binary numbers ZERO and ONE to consecutively number uniform address segments arranged along the control track for position control and a third pulse character which together with said binary characters are arranged with equally spaced leading edges for speed control, a control head to reproduce the recorded control track pulses from the tape, tape drive means to move the tape past the control head in either direction, control means connected to said tape drive means for regulating the speed and position of the tape driven by said drive means in response to the control track pulses being reproduced from the tape, said control means including means producing a train of periodic reference pulses, a speed control circuit operative in the run mode and including means for comparing the phase and frequency of the control track pulses and the train of reference pulses and means responsive to said comparing means for adjusting the tape drive to synchronize the phase and frequency of the control and reference pulses;

said control means also including a position control circuit operative in the search mode including means producing timing pulses synchronized with tape speed, means responsive to said timing pulses for decoding said reproduced control track pulses independently of tape speed, means for comparing each successive decoded control track address number with a next selected address number and means for generating a difference signal of a polarity and magnitude related to the direction and distance respectively to the next selected number.

10. In a magnetic tape information retrieval system the combination of:

a magnetic tape having segments of information recordings on information tracks and a control track coextensive with the information tracks, said control track being divided into tape address segments of equal length, and having a succession of control pulses recorded on the control track, the control pulses being coded using two pulse characteristics representing binary numbers ZERO and ONE to number the tape segments consecutively along the tape and having uniformly spaced leading edges, a control head to reproduce the control pulses from the tape, tape drive means to move the tape past the control head in either direction, clock means to produce periodic reference pulses, timing disk means synchronized with the speed of the tape to generate periodic timing pulses, control circuit means connected to said tape drive means for selectively regulating the movement of said tape drive means in response to the control pulses reproduced from the tape, said control circuit means including a speed logic circuit operable in the run mode and a position control logic circuit operable in the search mode;

said speed logic circuit including means for comparing the phase and frequency of the reproduced control pulses with the reference pulses and means responsive to said comparing means for producing an output voltage proportional to any differences between the phase and frequency of the control and reference pulses to control the speed of the tape drive means;

said position control logic circuit operable independently of said speed logic circuit including a gate controlled by the reproduced control track pulses to gate the timing disk pulses during each control track pulse, decoder means for counting the timing pulses gated during each timing disk pulse so that the control track pulses are decoded independently of tape speed, a bi-directional shift register loaded by the decoded control track pulses, an address register loaded by the shift register, a selection register loaded by a selected address number corresponding to a particular information recording on the tape, and a comparator logic circuit responsive to the selection register and the address register for generating a difference signal of a polarity and magnitude related to the direction and distance respectively to the next selected address number on said magnetic tape.

11. In a magnetic tape information retrieval system as set forth in claim 10 wherein said position control logic circuit includes a shift register control connected between the decoder means and the bi-directional shift register to orient the information loaded into the shift register in the proper sequence independently of the direction of the tape movement.

12. In a magnetic tape information retrieval system as set forth in claim 10 including dump circuit means to control the loading of the address register by the shift register when the shift register and address register are not in step.

13. In a magnetic tape information retrieval systems as set forth in claim 10 wherein a count of selected numbers of timing pulses represents a particular address character.

14. In a magnetic tape information retrieval system as set forth in claim 10 wherein said speed logic circuit and position logic circuit are arranged in parallel with the tape drive means and are alternately connected thereto by an electric switch.

15. In a magnetic tape information retrieval system as set forth in claim 10 including cue signals recorded on the information track to identify the exact beginning of each recorded information segment and means to reproduce the cue signals coupled to the control means to stop the tape drive means at the beginning of a selected information recording.

16. A magnetic tape information retrieval system comprising:

a magnetic tape, tape drive means for moving the tape in either direction, means for recording information on information tracks on the tape and reproducing the recorded information from the tape during the movement thereof, means for recording control track pulses on a control track of the tape coextensive with the information tracks and reproducing the control track pulses from the tape during movement thereof, said control track pulses being coded using two pulse characters representing binary numbers ZERO and ONE and arranged to consecutively number address segments of uniform lengths along the control track and a third character which together with the binary characters are recorded with equally spaced leading edges, control circuit means connected to said tape drive means for regulating the speed and position of the tape drive means, said control circuit means including a speed control circuit operable in the run mode having means for comparing the reproduced control pulses with the periodic reference pulses and means responsive to said comparing means for adjusting the speed of the tape drive means so that the positions of the control and reference pulses are synchronized;

said control circuit means also including a position control circuit operable in the search mode having means for decoding the control track pulses independently of tape speed, means for comparing each successive decoded control track address number with a next selected address number and means for deriving a difference signal of a polarity and magnitude related to the direction and distance to the next selected address number on said magnetic tape.

17. Method for locating information segments on a storage medium movable relative to information and control transducers at various search speeds whereby an information segment defined by a predetermined address may be located rapidly relative to the information transducer, said medium having a control track carrying control information for controlling the relative speed and relative position between the transducers and the medium and wherein the position information in the control track has a predetermined positional relationship to an information segment it is associated with, said method comprising the steps of:

transducing the control track decoding the position information transduced from the control track irrespective of the relative speed between the medium and the control transducer so as to be able to determine the present position of the control transducer while the search speed is being adjusted;

comparing the present position of the control transducer with the predetermined address;

adjusting the search speed of the medium relative to the control transducer as a function of the distance between the present position and the predetermined address so that as the predetermined address approaches the control transducer the speed of the medium relative to the control transducer is adjusted towards a run speed at which the information transducer may read the information segment associated with the predetermined address.

18. The method of claim 17, and in addition, the steps of:

detecting the actual run speed of the medium relative to the control transducer after the control transducer has reached the predetermined address by monitoring the signals transduced from the control track;

comparing the actual run speed with a predetermined desired run speed;

adjusting the run speed of the medium relative to the control transducer so that the actual run speed becomes the predetermined desired run speed.

19. The method of claim 17 wherein said decoding step comprises the steps of:

detecting the duration of address signals recorded at each address segment on the medium;

detecting the speed of movement of the medium relative to the control transducer;

determining the present position from the width of the address signal in each address segment by analyzing the duration of the address signal in view of the speed of the medium relative to the control transducer.

* * * * *